(12) United States Patent
Horne et al.

(10) Patent No.: US 11,282,302 B2
(45) Date of Patent: Mar. 22, 2022

(54) COMMUNICATIONS SERVER FOR MONITORING AND TESTING A VEHICLE

(71) Applicant: The Boeing Company, Chicago, IL (US)

(72) Inventors: William P. Horne, Snohomish, WA (US); Erin E. Warr, Kent, WA (US); Norman F. Kirby, Bothell, WA (US); Suzanne M. Schoonover, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 778 days.

(21) Appl. No.: 15/976,448

(22) Filed: May 10, 2018

(65) Prior Publication Data

US 2019/0347871 A1    Nov. 14, 2019

(51) Int. Cl.
| | |
|---|---|
| *G01M 17/00* | (2006.01) |
| *G07C 5/00* | (2006.01) |
| *G07C 5/08* | (2006.01) |
| *H04W 4/44* | (2018.01) |

(52) U.S. Cl.
CPC ............ *G07C 5/008* (2013.01); *G07C 5/085* (2013.01); *G07C 5/0808* (2013.01); *H04W 4/44* (2018.02)

(58) Field of Classification Search
CPC ...... G07C 5/008; G07C 5/0808; G07C 5/085; H04W 4/44
See application file for complete search history.

(56) References Cited

U.S. PATENT DOCUMENTS

| | | | |
|---|---|---|---|
| 2012/0136743 A1* | 5/2012 | McQuade | G06Q 30/0283 705/26.3 |
| 2018/0174067 A1* | 6/2018 | Spiro | G06K 9/6253 |
| 2019/0362566 A1* | 11/2019 | Mattern | G06F 13/24 |

* cited by examiner

*Primary Examiner* — Adam M Alharbi
(74) *Attorney, Agent, or Firm* — MH2 Technology Law Group LLP

(57) ABSTRACT

According to various embodiments, a method for monitoring and troubleshooting a vehicle using a communications server is presented. The communications server includes a plurality of request handlers, including a dynamic monitor request handler, each coupled to a message handler and to a client request dispatcher, a vehicle communications interface coupled to a message handler, which is coupled to at least one vehicle communications interface and to the plurality of request handlers, and a client interface coupled to the client request dispatcher and to the vehicle. The method includes coupling the vehicle communications interface to the vehicle, coupling the client interface to a client computer, storing in RAM formatting information for each of the vehicle parameters, receiving a request, sending a message representing the request to an appropriate request handler, communicating with the vehicle, receiving a response, and providing the response to the at least one client computer.

24 Claims, 13 Drawing Sheets

COMMUNICATIONS SERVER FOR MONITORING AND TESTING A VEHICLE

FIELD

This disclosure relates generally to testing and troubleshooting problems with a vehicle, such as an aircraft.

BACKGROUND

Monitoring and troubleshooting a vehicle, such as an aircraft, is typically done through connected clients computers that submit requests, and it is typically based on a time snapshot data view.

SUMMARY

According to various embodiments, a communications server for monitoring and troubleshooting a vehicle is presented. The communications server includes a dynamic monitor request handler configured to provide values of a plurality of vehicle parameters throughout a period of time; at least one vehicle communications interface communicatively coupled to the dynamic monitor request handler and configured to communicatively couple to the vehicle and pass messages between the vehicle and the dynamic monitor request handler.

Various optional features of the above embodiments include the following. The communications server may include a client request dispatcher configured to receive a request comprising a request to provide values of a particular plurality of vehicle parameters throughout a particular period of time from at least one client through the at least one client interface, send a message representing the request to the dynamic monitor request handler, receive a response to the request from the dynamic monitor request handler, and provide the response to the at least one client computer. The vehicle communications interface may include a plurality of vehicle interface cards and an application program interface. The communications server may be present at a vehicle factory and applied to a vehicle during a final assembly of the vehicle.

According to various embodiments, a communications server for monitoring and troubleshooting a vehicle is presented. The communications server includes: a vehicle communications interface communicatively coupled to a message handler and configured to communicatively couple to the vehicle and pass messages between the vehicle and the message handler; at least one request handler communicatively coupled to the message handler; and a message handler communicatively coupled to the at least one vehicle communications interface and to the at least one request handler, wherein the message handler is configured to store in random access memory formatting information for each of the plurality of vehicle parameters, wherein the message handler is further configured to communicate with the vehicle using at least some of the formatting information to perform requests from the at least one request handler.

Various optional features of the above embodiments include the following. The message handler may be further configured to communicate with the vehicle using at least some of the formatting information to perform a request to read a value of a particular parameter for the vehicle by at least: locating from random access memory, using a hash table, formatting information for the particular parameter; reading a value of the particular parameter from the vehicle; formatting the value of the particular parameter according to the formatting information for the particular parameter; and providing the value of the particular parameter in response to the request. The vehicle communications interface may include a plurality of vehicle interface cards and an application program interface. The communications server may be present at a vehicle factory and applied to a vehicle during a final assembly of the vehicle.

According to various embodiments, a communications server for monitoring and troubleshooting a vehicle is presented. The communications server includes: a vehicle communications interface communicatively coupled to at least one request handler and configured to communicatively couple to the vehicle and pass messages between the vehicle and the at least one request handler; at least one request handler communicatively coupled to the vehicle communications interface, to a client request dispatcher, and to an onboard troubleshooting functions module; a client request dispatcher communicatively coupled to the at least one request handler and configured to receive a request from an onboard troubleshooting functions module, send a message representing the request to an appropriate request handler of the at least one request handler, receive a response to the request from the appropriate request handler, and provide the response to the onboard troubleshooting functions module; an onboard troubleshooting functions module communicatively coupled to the client request dispatcher, wherein the onboard troubleshooting functions module stores a plurality of troubleshooting functions for the vehicle; and a user interface 116 for the onboard troubleshooting functions module.

Various optional features of the above embodiments include the following. The onboard troubleshooting functions module may be configured to receive a user request at the user interface, present a message representing the request to the client request dispatcher, receive a response message from the client request dispatcher, and display to the user information representing the response message. The vehicle communications interface may include a plurality of vehicle interface cards and an application program interface. The communications server may be present at a vehicle factory and applied to a vehicle during a final assembly of the vehicle.

According to various embodiments, a method of monitoring and troubleshooting a vehicle using a communications server comprising a dynamic monitor request handler communicatively coupled to at least one vehicle communications interface, wherein the dynamic monitor request handler is configured to provide values of a plurality of vehicle parameters throughout a period of time, is provided. The method includes: communicatively coupling the at least one vehicle communications interface to the vehicle; receiving, by the system, a request to provide values of a plurality of vehicle parameters throughout a period of time; sending, by the system, a message representing the request to the dynamic monitor request handler; communicating, by the system, with the vehicle, to perform the request; receiving, by the system, a response to the request from the dynamic monitor request handler; and providing the response.

Various optional features of the above embodiments include the following. The request may include a request to provide values of a particular plurality of vehicle parameters throughout a particular period of time, wherein the appropriate request handler comprises the dynamic monitor request handler, and the method may further include, by the client request dispatcher: sending a message representing the request to the dynamic monitor request handler; receiving a response to the request from the dynamic monitor request handler; and providing the response to the at least one client computer. The vehicle communications interface may include a plurality of vehicle interface cards and an application program interface. The method may be applied to a vehicle during a final assembly of the vehicle at a factory.

According to various embodiments, a method of monitoring and troubleshooting a vehicle using a communications server comprising at least one request handler communicatively coupled to a at least one vehicle communications interface, at least one vehicle communications interface communicatively coupled to a message handler and configured to pass messages between the vehicle and the message handler, and a message handler communicatively coupled to the at least one vehicle communications interface and to the at least one request handler, is provided. The method includes: communicatively coupling the at least one vehicle communications interface to the vehicle; storing in random access memory of the message handler formatting information for each of the plurality of vehicle parameters; receiving, by the system, a request; sending a message representing the request to an appropriate request handler of the at least one request handler; communicating, by the message handler, with the vehicle, using at least some of the formatting information, to perform the request; receiving, by the system, a response to the request from an appropriate request handler; and providing the response.

Various optional features of the above embodiments include the following. The request may include a request to read a value of a particular parameter for the vehicle, and the method may further include: locating from random access memory, using a hash table, formatting information for the particular parameter; reading a value of the particular parameter from the vehicle; formatting the value of the particular parameter according to the formatting information for the particular parameter; and providing the value of the particular parameter in response to the request. The vehicle communications interface may include a plurality of vehicle interface cards and an application program interface. The method may be applied to a vehicle during a final assembly of the vehicle at a factory.

According to various embodiments, a method of monitoring and troubleshooting a vehicle using a communications server comprising a vehicle communications interface communicatively coupled to at least one request handler and configured to communicatively couple to the vehicle and pass messages between the vehicle and the at least one request handler, at least one request handler communicatively coupled to the vehicle communications interface, to a client request dispatcher, and to an onboard troubleshooting functions module, a client request dispatcher communicatively coupled to the at least one request handler, an onboard troubleshooting functions module communicatively coupled to the client request dispatcher, wherein the onboard troubleshooting functions module stores a plurality of troubleshooting functions for the vehicle, and a user interface for the onboard troubleshooting functions module, the method comprising: receiving, by the client requires dispatcher, a request from the onboard troubleshooting functions module; sending a message representing the request to an appropriate request handler of the at least one request handler; receiving results of the request from the appropriate request handler; providing the response to the onboard troubleshooting functions module.

Various optional features of the above embodiments include the following. The method may include: receiving the request at the user interface; presenting a message representing the request to the client request dispatcher; receiving a response message from the client request dispatcher; and displaying information representing the response message. The vehicle communications interface may include a plurality of vehicle interface cards and an application program interface. The method may be applied to a vehicle during a final assembly of the vehicle at a factory.

BRIEF DESCRIPTION OF THE DRAWINGS

Various features of the examples can be more fully appreciated, as the examples become better understood with reference to the following detailed description, when considered in connection with the accompanying figures, in which.

DESCRIPTION

Reference will now be made in detail to the disclosed embodiments, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration of specific examples. These examples are described in sufficient detail to enable those skilled in the art to practice them and it is to be understood that other examples may be utilized and that changes may be made without departing from the scope of the disclosure. The following description is, therefore, merely exemplary.

Figure 1:
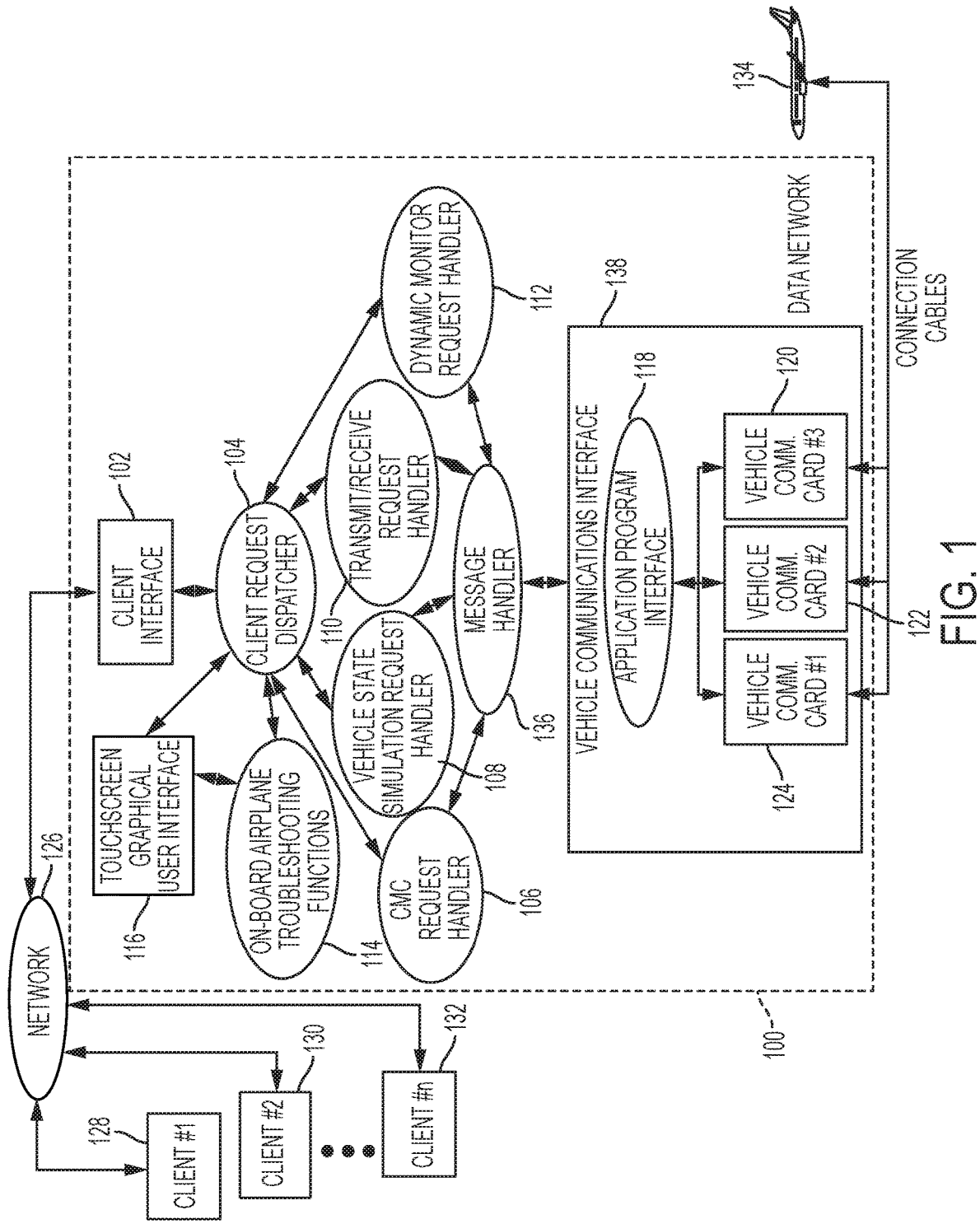
FIG. 1 is a schematic diagram of a communications server for monitoring and testing a vehicle according to various embodiments.

FIG. 1 is a schematic diagram of a communications server 100 for monitoring and testing a vehicle according to various embodiments. Communications server 100 as shown in FIG. 1 may be a communications server for testing and troubleshooting vehicle 134, which may be an aircraft or airplane, for example. Other possibilities for vehicle 134 include, by way of non-limiting examples, a train, a car, a ship, a rocket, a submarine, a space shuttle, a cruise ship, a drone, a one-manned vehicle, an automotive, or a flying automotive.

Communications server 100 may be implemented at a factory, and used to test vehicles at, during, or after final assembly. Alternately, or in addition, communications server 100 may be used during vehicle maintenance or refurbishment (i.e., after the vehicle has entered service).

Communications server 100 may communicate with vehicle 134 using nonstandard or standard protocols, such as, by way of non-limiting example, an Aeronautical Radio Incorporated ("ARINC") protocol standard. One or more vehicle communication cards 120, 122, 124 may be used to affect the communication.

The elements and functionality of communications server 100 will be described in view of FIG. 1 as well as the subsequent figures, as follows. Depicted in FIG. 1 are internal software elements 102, 104, 106, 108, 110, 112, 116, 118, as well as the communications cards 120, 122, 124. Also depicted are external elements, such as network 126, which may be an Ethernet, and client computers 128, 130, 132.

Any number of client computers 128, 130, 132 may connect to communications server 100 via network 126. According to some embodiments, client computers 128, 130, 132 may be Automated Test Equipment ("ATE") client computers, which are dedicated computers for testing vehicles that act as masters once connected to the vehicle and that are able to execute user commands. Client computers 128, 130, 132 may be configured to run pre-authored test sequences. However, client computers 128, 130, 132 can be any system that is capable of transmitting and receiving the defined set of requests and responses to/from communications server 100. Client computers 128, 130, 132 may send requests to communications server 100 at any time.

Requests from client computers 128, 130, 132 may be of four different kinds, according to some embodiments. A first type of request to perform a Central Maintenance Computer ("CMC") test, which is handled by CMC request handler 106. In general, a CMC test checks diagnostic values of specified vehicle parameters. A second type of request is to perform a vehicle state simulation, which is handled by vehicle state simulation request handler 108. The vehicle state simulation request may simulate any of a variety of possible vehicle states, which may be generally referred to as a first state, a second state, etc. Vehicle states may include, for example, (for aircraft) in the air, on the ground, or at various altitudes or atmospheric layers, (for a submersible vehicle) below the surface, at the surface, or at various depths, and (for a ship) docked or at sea. A third type of request is a request to perform a transmission or reception, which is handled by transmit/receive request handler 110. Such a transmission or reception may be of a vehicle parameter value, for example. A fourth type of request is a request to perform a dynamic monitor action, which involves monitoring and recording a specific set of parameters throughout a specified period of time and is handled by dynamic monitor request handler 112. Communications server 100 receives the client requests via the client interface 102, according to some embodiments, and the requests are passed to client request dispatcher 104. Client request dispatcher operates to determine the request type and pass the request to the appropriate request handler.

Note that some embodiments may omit or disable one or more request handlers shown and described in reference to FIG. 1. For example, CMC request handler 106 and vehicle state simulation request handler 108 are generally specific to the vehicle; therefore, one or both may be omitted, e.g., from embodiments that are intended for use with vehicles that lack CMC or vehicle state simulation capabilities.

Client request dispatcher 104 receives incoming requests from connected client computers 128, 130, 132, and calls upon the appropriate request handler module to perform the request. Incoming requests may be received from ATE client computers via a communication network connection such as an Ethernet network connection in a pre-specified format such as XML. Client request dispatcher 104 delivers a function call corresponding to the request to the appropriate request handler, awaits its completion, and receives the results from that module once the request is completed. Next, client request dispatcher 104 packages the results into response message in the pre-specified format. Client request dispatcher 104 then sends the response message back to the requesting client via the network connection, according to some embodiments. This process is further described in view of FIG. 2, presently.

Figure 2:
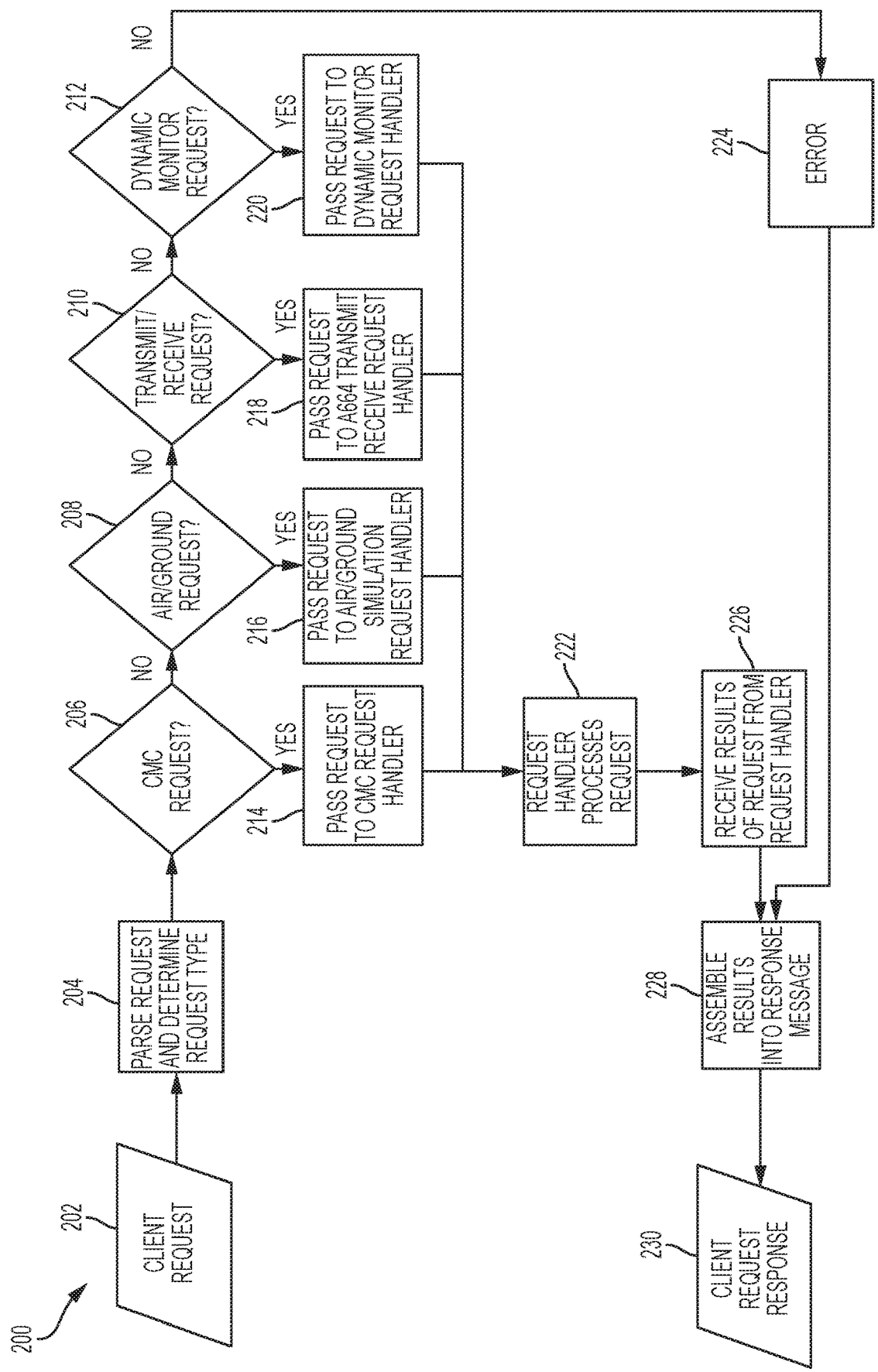
FIG. 2 is a flow diagram of processing by a client request dispatcher according to various embodiments.

FIG. 2 is a flow diagram of processing 200 by client request dispatcher 104 according to various embodiments. Client request dispatcher 104 analyzes request 202 from one of client computers 128, 130, 132 and, according to some embodiments, determines if the current communications server 100 resource usage by other client computers will allow this client computer's request to be performed at this time. If not, then the client computer is informed that the request cannot be performed. If so, then it is parsed 204 to determine its request type, and a corresponding function call is directed to the appropriate request handler. Thus, at block 206, client request dispatcher 104 determines whether request 202 is a CMC request, and, if so, passes a corresponding function call to CMC request handler 106 per block 214 to process the request per block 222, after which control is passed to block 226. If the request is of a different type, then the function call is passed to block 208 to determine whether it is an vehicle state simulation request and, if so, passed to vehicle state simulation request handler 108 per block 216 to process the request per block 222, after which control is passed to block 226. If request 202 is not an vehicle state simulation request, then the function call is passed from block 208 to block 210 to determine whether it corresponds to a transmit/receive request, and, if so, passed to transmit/receive request handler 110 per block 218 to process the request per block 222, after which control is passed to block 226. If request 202 is not a transmit/receive request, then the corresponding function call is passed to block 212 to determine whether it is a dynamic monitor request and, if so, passed to dynamic monitor request handler 112 per block 220 to process the request per block 222, after which control is passed to block 226. Per block 212, if request 202 is none of the aforementioned types, then an error message is generated per block 224 and control is passed to block 228. Otherwise, per block 222, the appropriate request handler processes the function call corresponding to request 202, and the results of such processing are received by client request dispatcher 104 per block 226, after which control passes to block 228. Per block 228, the request handler results, or the error message, are assembled into a response message, and per bock 230 the response message is delivered to client interface 102 for transmission to the client computer 128, 130, 132 that initiated request 202.

Once client request dispatcher 104 delivers the request to the appropriate request handler 106, 108, 110, 112, such request handler processes the request as disclosed in detail below in reference to at least FIGS. 4, 5, 6, and 7. In general, the request handlers 106, 108, 110, 112 receive requests and return results in a similar manner. According to some embodiments, they process the request and interact with vehicle communication cards 120, 122, 124 to transmit and receive data to and from vehicle 134. The request handlers 106, 108, 110, 112 interact with the vehicle communication cards 120, 122, 124 via message handler 136 in order to send or receive data to or from vehicle 134.

Message handler 136 acts as an intermediary between request handlers 106, 108, 110, 112 and vehicle communication cards 120, 122, 124. Thus, message handler 136 formats data for transmission via Application Programmers Interface ("API") 118 for vehicle communications cards 120, 122, 124 so that the request handlers 106, 108, 110, 112 need not utilize resources for data formatting. Further, message handler 136 retrieves and retains received data via the same API 118. Collectively, API 118 and vehicle communications cards 120, 122, 124 form vehicle communications interface 138. Note that some vehicles such as aircraft may have an onboard data communications bus through which messages to and from the vehicles may pass. In general, references to communicating with vehicle 134 refer to communicating via such a bus for vehicles that have such a bus.

Further, message handler 136 provides data encoding and decoding capability in order to convert the raw binary data into the actual value that it represents, and vise-versa. The encoding and decoding function may utilize electronically stored formatting information for each relevant parameter. The formatting information specifies how to convert parameter values between a format consumed and produced by vehicle 134 and a format consumed and produced by client computers 128, 130, 132. Thus, according to some embodiment, message handler 136 includes a high-performance in-memory formatting information retrieval system. Message handler 136, its functionality, and its high-performance in-memory formatting information retrieval system are further described in detail below in reference to FIGS. 7, 8, 9, 10, and 11.

Once the processing of the client's request is completed by the appropriate request handler 106, 108, 110, 112, such request handler passes the results of the request back to client request dispatcher 104. Client request dispatcher 104 then passes the results back to the requesting client computer 128, 130, 132 via network 126.

The individual request handlers are now described in detail.

Figure 3:
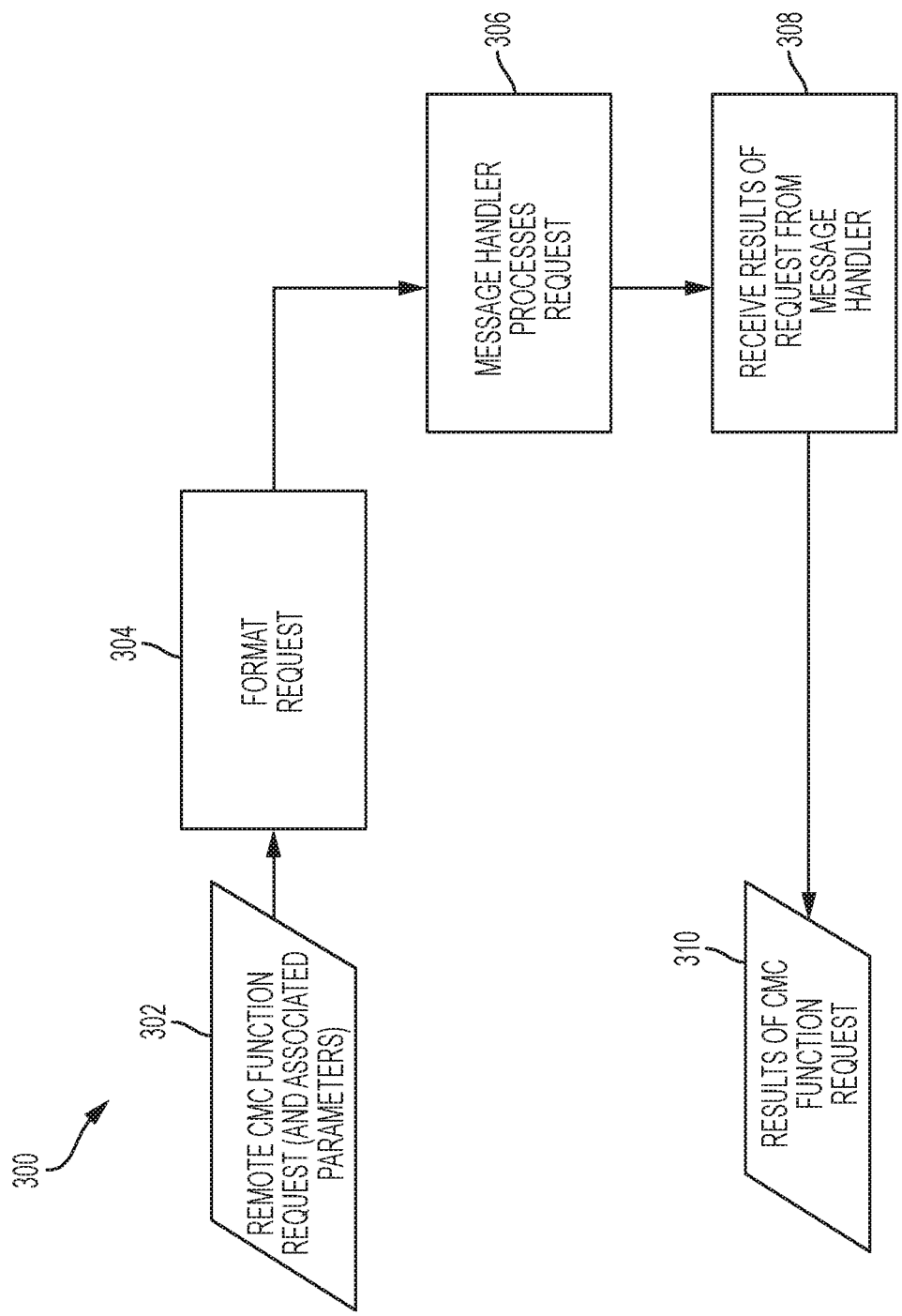
FIG. 3 is a flow diagram of central maintenance computer request handler processing according to various embodiments.

FIG. 3 is a flow diagram of Central Maintenance Computer ("CMC") request handler 106 processing 300 according to various embodiments.

Communications server 100 provides a number of functions that can be performed remotely by connected test equipment via one or more vehicle communication cards 120, 122, 124. Such functions are referred to herein as "remote CMC functions". CMC request handler 106 provides a way for client request dispatcher 104 to request that any one of the remote CMC functions be performed. The requests from client request dispatcher 104 include both the specific remote CMC function request as well as any associated parameters for that request.

In operation, once the remote CMC function request 302 and associated parameters are received by CMC request handler 106, it formats 304 the request into a properly formatted message using stored formatting information and passes that message on to message handler 136 to process 306. Once message handler 136 finishes processing the message, it returns the results 310 of the remote CMC function request back to CMC request handler 106, which receives 308 the results. CMC request handler 106 then passes the results 310 of the remote CMC function request back to client request dispatcher 104.

Figure 4:
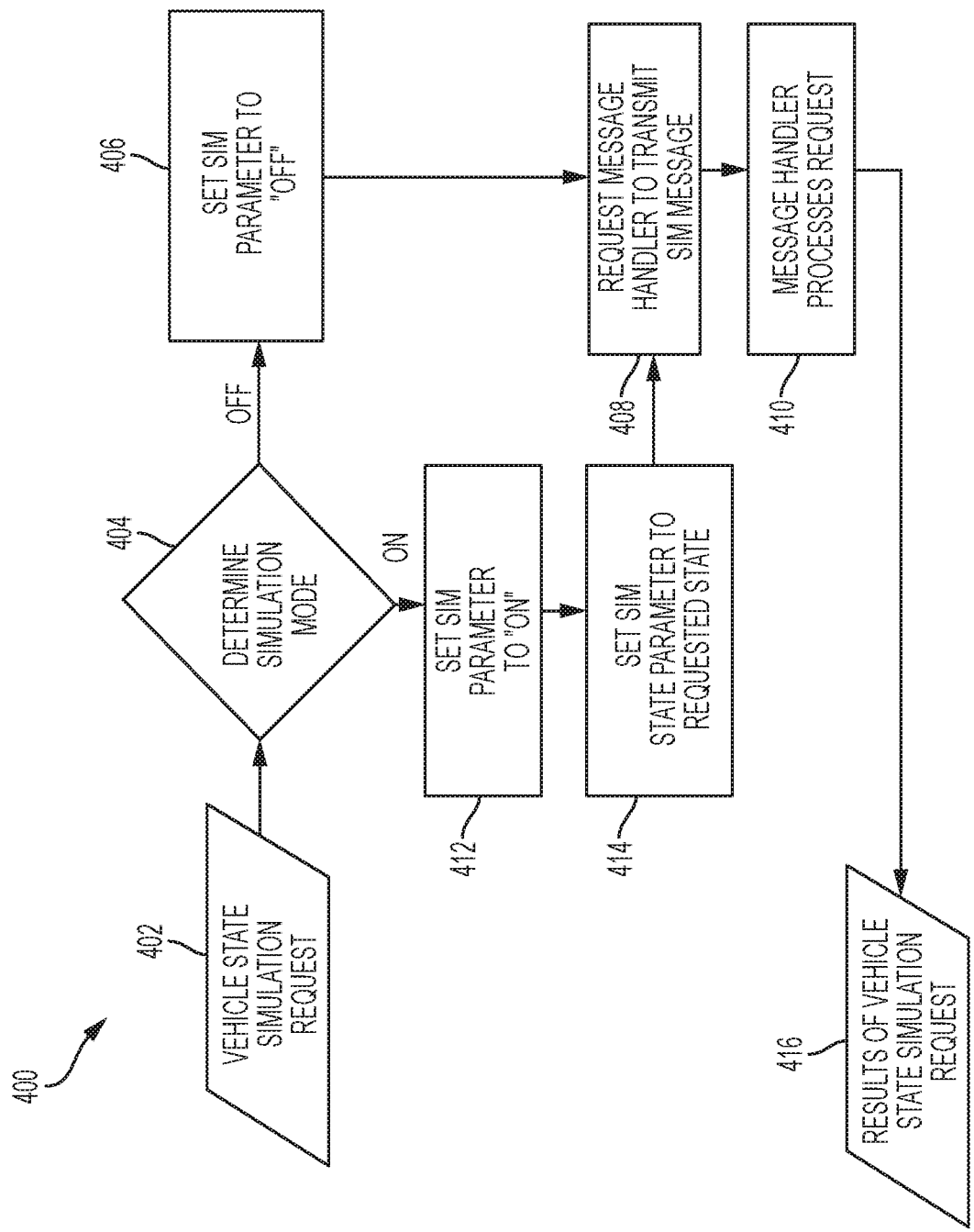
FIG. 4 is a flow diagram of vehicle state simulation request handler processing according to various embodiments.

FIG. 4 is a flow diagram of vehicle state simulation request handler 108 processing 400 according to various embodiments. Processing 400 may be implemented in embodiments where the vehicle has a plurality states that may be simulated. For example, a vehicle may have a first state, a second state, and potentially additional states, when in operation. Under test conditions, the vehicle may enter a simulation mode, where it can simulate being in the first state, the second, state, etc. For the particular case of aircraft, for example, some aircraft may have sensors to determine if the aircraft is on the ground or if it is in the air. Many airplane avionic systems behave differently depending on the air/ground state. For test purposes, some aircraft have the capability to simulate being in air or on ground, regardless of what the actual air/ground sensors indicate. More generally, the vehicle include an interface by which connected test equipment may activate and control the simulated state. The vehicle state simulation request handler 108 provides a way for the client request dispatcher 104 to request an vehicle state simulation to be activated or deactivated, as well as which state to simulate, depending on the particular vehicle.

In operation, after the vehicle state simulation request 402 is received, the vehicle state simulation request handler 108 determines the requested simulation mode per block 404. If "ON", then control passes to block 412, where an vehicle state simulation parameter is set to "ON" using the process of FIG. 8, and then to block 414, where an vehicle state simulation state parameter is set to the requested state using the processing 800 of FIG. 8. If "OFF", then control passes to block 406, where such parameter is set to "OFF" using the process of FIG. 8. Note that the setting process described below may include formatting the parameter values. For either branch of the process, after blocks 406 and 414, control passes to block 408, where vehicle state simulation request handler performs processing 400 of the requests that message handler 136 transmit a vehicle state simulation request message to the aircraft. Per block 140, message handler 136 transmits the request, using the process of FIG. 10, for example. The vehicle state simulation request handler 108 then waits for message handler 136 to complete the transmission request, and receives any results of the request at block 416. The vehicle state simulation request handler 108 then passes these results back to client request dispatcher 104 for delivery to the requesting client computer 128, 130, 132.

Figure 5:
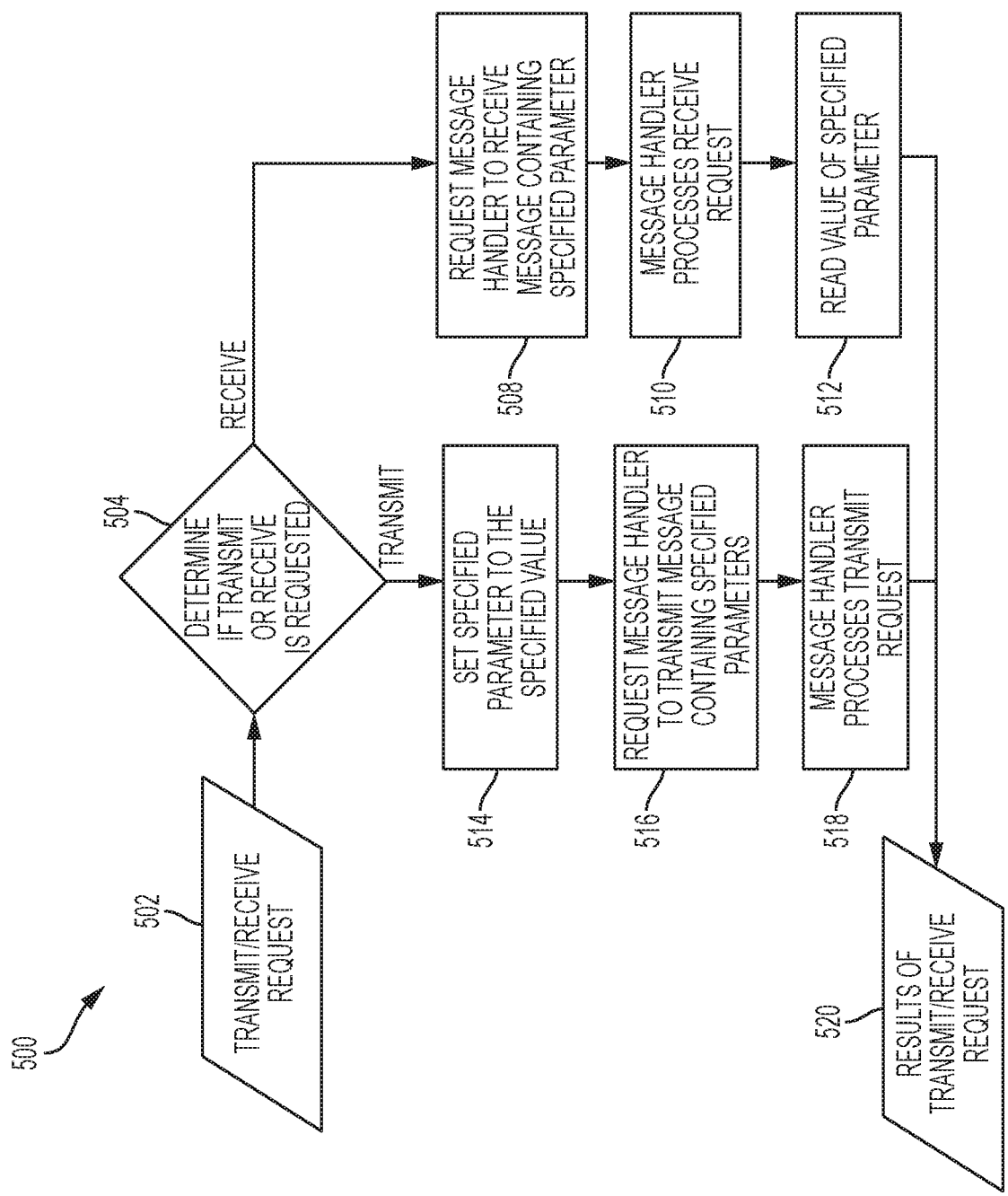
FIG. 5 is a flow diagram of transmit/receive request handler processing according to various embodiments.

FIG. 5 is a flow diagram for transmit/receive request handler processing 500 according to various embodiments. In general, the transmit/receive request handler 110 accepts incoming requests (from the client request dispatcher 104) to either transmit a specified parameter with a specified value to vehicle 134, or to receive a specified parameter from vehicle 134 (or its data network).

In operation, once the request 502 is received by transmit/receive request handler 110, transmit/receive request handler 110 determines 504 whether the request is for a transmission or a reception. If, on the one hand, request 502 is for transmission, then control passes to block 514, where transmit/receive request handler 110 sets the value of the specified parameter using process 800 of FIG. 8. Next, transmit/receive request handler 110 requests 516 that message handler 136 transmit a message containing the specified parameter value to vehicle 134. At block 518, message handler 110 processes the transmit request, after which control passes to block 520, where transmit/receive request handler obtains the results 520 of the transmit request. Returning to block 504, if, on the other hand, request 502 is for reception, control passes to block 508, where transmit/receive request handler 110 requests that message handler 136 receive a message containing the specified parameter value to vehicle 134. Per block 510, message handler 136 processes the receive request, after which control passes to block 512, where transmit/receive request handler obtains the results 520 of the request 502. The value of the parameter is then read and passed back to client request dispatcher 104.

Figure 6:
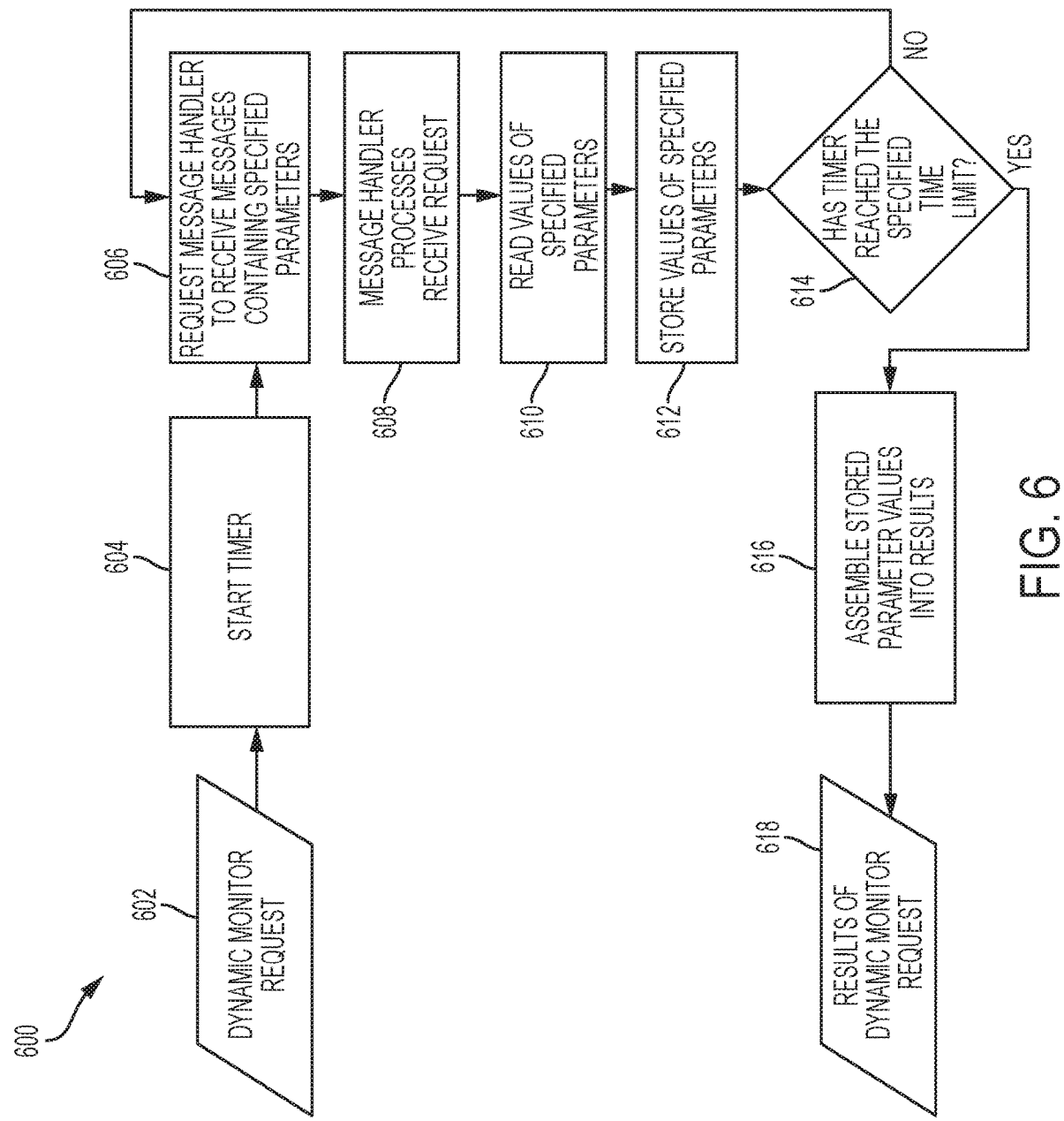
FIG. 6 is a flow diagram of dynamic monitor request handler processing according to various embodiments.

FIG. 6 is a flow diagram of dynamic monitor request handler 112 processing 600 according to various embodiments. In general, dynamic monitor request handler 112 allows clients 128, 130, 132 to collect a continuous stream of data for multiple parameters on vehicle 134 throughout a specified amount of time. The collection of a continuous stream of data enables the systems of clients 128, 130, 132 to perform analysis of vehicle 134 behavior over a period of time, as opposed to just a single snapshot of time. This extension of the test capability is very useful during vehicle test and verification in the factory.

In operation, dynamic monitor request handler 112 is somewhat similar to the reception portion of transmit/receive request handler 110 processing 500 described above. Differences include that dynamic monitor request handler 112 accepts requests to receive a collection of parameters rather than just one, and that the parameters can be requested to be read continually over a period of time, resulting in a stream of variable data values for each requested parameter. Thus, once dynamic monitor request handler 112 receives dynamic monitor request 602, it starts a timer 604 that lasts the duration of the requested monitoring period. Control then passes to block 606, where dynamic monitor request handler 112 requests that message handler 136 receive messages containing values of specified parameters. Per block 608, message handler 136 processes the request to receive the parameter values using processing 1100 of FIG. 11, and per block 610 reads the values using processing 900 of FIG. 9. Per block 612, dynamic monitor request handler then stores the values of the specified parameters in local memory. At block 614, dynamic monitor request handler 112 determines whether the timer initiated at block 604 has reached the end of the specified time period. If not, then control passes back to block 606. Otherwise, if so, then control passes to block 616, where dynamic monitor request handler 112 assembles the stored parameter values into results 618 of the dynamic monitor request 602.

The functionality of message handler 136 is now described in detail. In particular, FIGS. 7, 8, 9, 10, and 11 describe various processing performed by message handler 136. In general, message handler 136 performs a variety of tasks involving communications between communications server 100 and vehicle 134.

In particular, message handler 136 formats data for consumption by clients 128, 130, 132 and vehicle 134. It may format any such data that can be transmitted or received by vehicle 134, via a bus of vehicle 134 or otherwise. Values of such parameters can be written (set) or read by any of the request handlers 106, 108, 110, 112.

Each parameter has an associated routine that can be used to convert between, on the one hand, data as consumed and produced by client computers 128, 130, 132, referred to herein as "working data format" and, on the other hand, the raw binary format that vehicle 134 expects the parameter to be in. For instance, an Altitude parameter may be supplied in working data format, such as "32,000 ft". The parameter, as stored and handled by communications server 100, may include information as to how to convert that into the expected raw binary format (i.e. "010011101000") and where to place that bit string in the message for vehicle 134 (e.g., "start bit=728"). The parameter as stored and processed may further include formatting information as to how to accomplish the reverse formatting operation, that is, from working data format to raw binary data format. Every parameter that can be transmitted or received, including its formatting information, may be stored in Random Access Memory ("RAM") for expedient processing. The result is that every parameter is readily available to the request handlers 106, 108, 110, 112 to be set or read and each one includes information as to how to it should be formatted both into raw binary and into data as consumed and produced by client computers 128, 130, 132. This is a significant improvement over prior art systems that must locate and access formatting information on disk at run time for each parameter received or transmitted.

Figure 7:
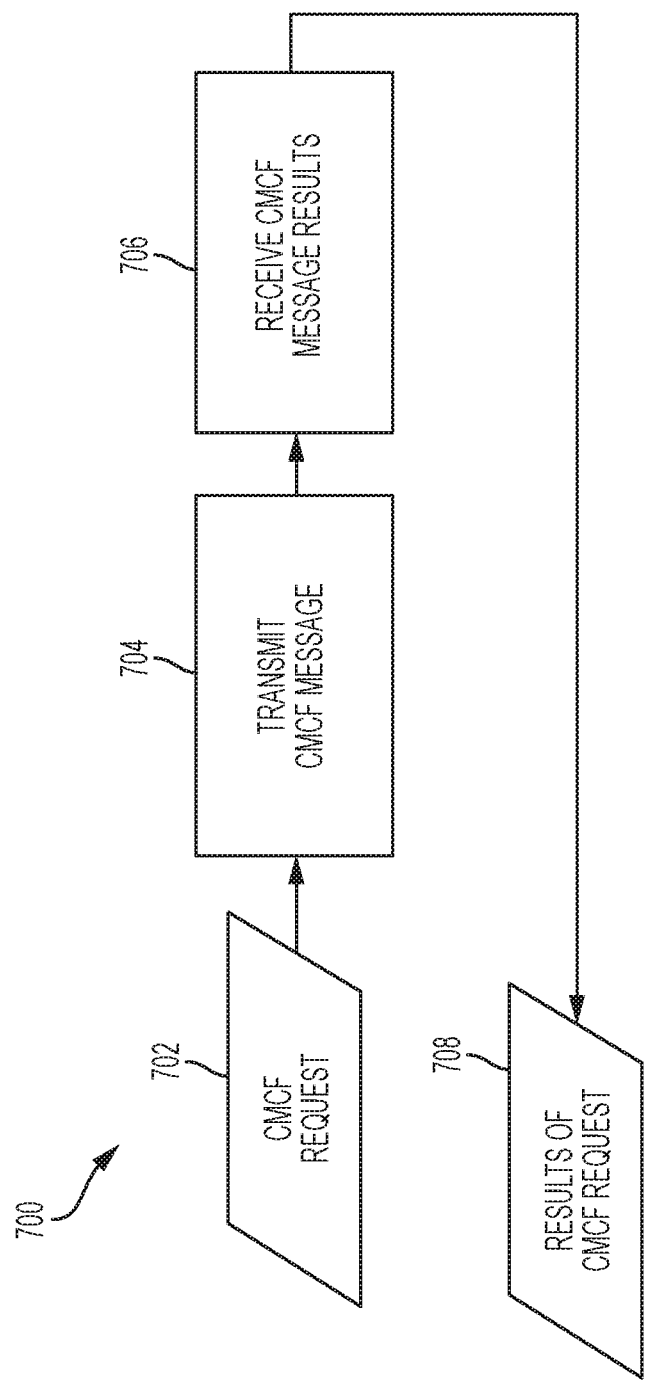
FIG. 7 is a flow diagram of a message handler process for processing a central maintenance computer function request according to various embodiments.

FIG. 7 is a flow diagram of a message handler 136 process for processing 700 of a Central Maintenance Computer Function ("CMCF") request 702 according to various embodiments. In general, message handler 136 transmits assembled remote CMCF request messages provided by a respective request handler 106, 108, 110, 112 on the vehicle 134 bus (using one or more vehicle communication card 120, 122, 124) and receives the results of the remote CMC function request. The results are then made available to the respective request handler 106, 108, 110.

In operation, once message handler 136 receives a CMCF request 702, it calls API 118 to transmit 704 a corresponding assembled CMCF request message to vehicle 134 via at least one vehicle communication card 120, 122, 124. Next, message handler 136 calls API 118 to receive 706 CMCF request results 708 from vehicle 134 via at least one vehicle communication card 120, 122, 124. Message handler 136 then passes the results 708 to the requesting request handler 106, 108, 110, 112.

Figure 8:
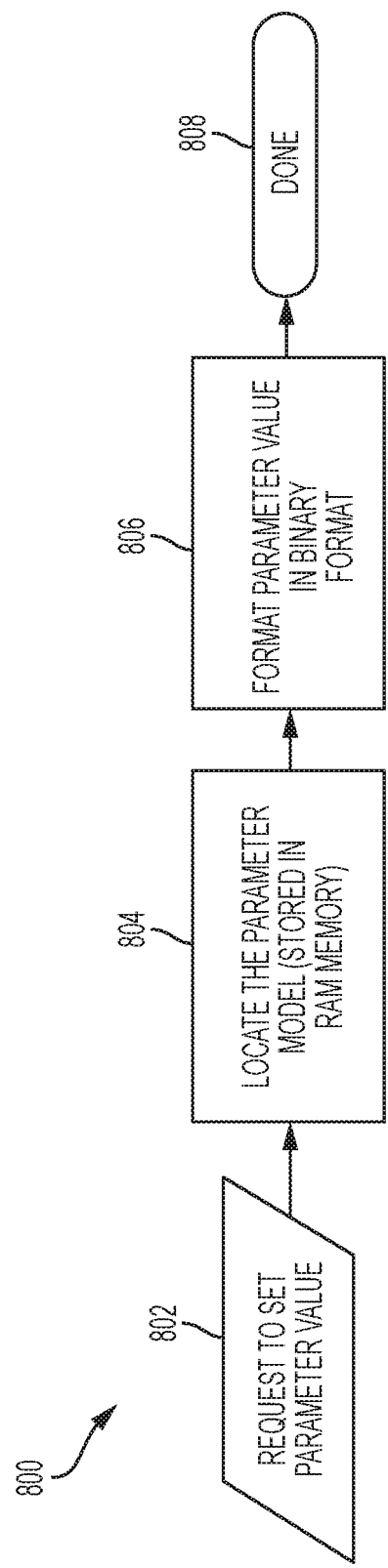
FIG. 8 is a flow diagram of a message handler process for processing a set parameter request according to various embodiments.

FIG. 8 is a flow diagram for a message handler 136 process for processing 800 a set parameter request 802 according to various embodiments. Processing 800 may be used in various techniques disclosed herein, e.g., vehicle state simulation request handler processing 400 of FIG. 4. Processing 800 may be performed by message handler 136.

In operation, message handler 136 receives a request 802 to set a particular vehicle parameter to a particular value. At block 804, message handler 136 locates formatting information stored in RAM for the particular parameter using a hash table. The formatting information specifies how to translate from raw binary data as consumed and produced by vehicle 134, and formatted data as consumed and produced by client computers 128, 130, 132. Per block 806, message handler 136 formats the particular value for the particular parameter into raw binary data using the formatting information from block 804 and passes the formatted particular value for the particular parameter to vehicle 134. At block 808, processing 800 may end.

Figure 9:
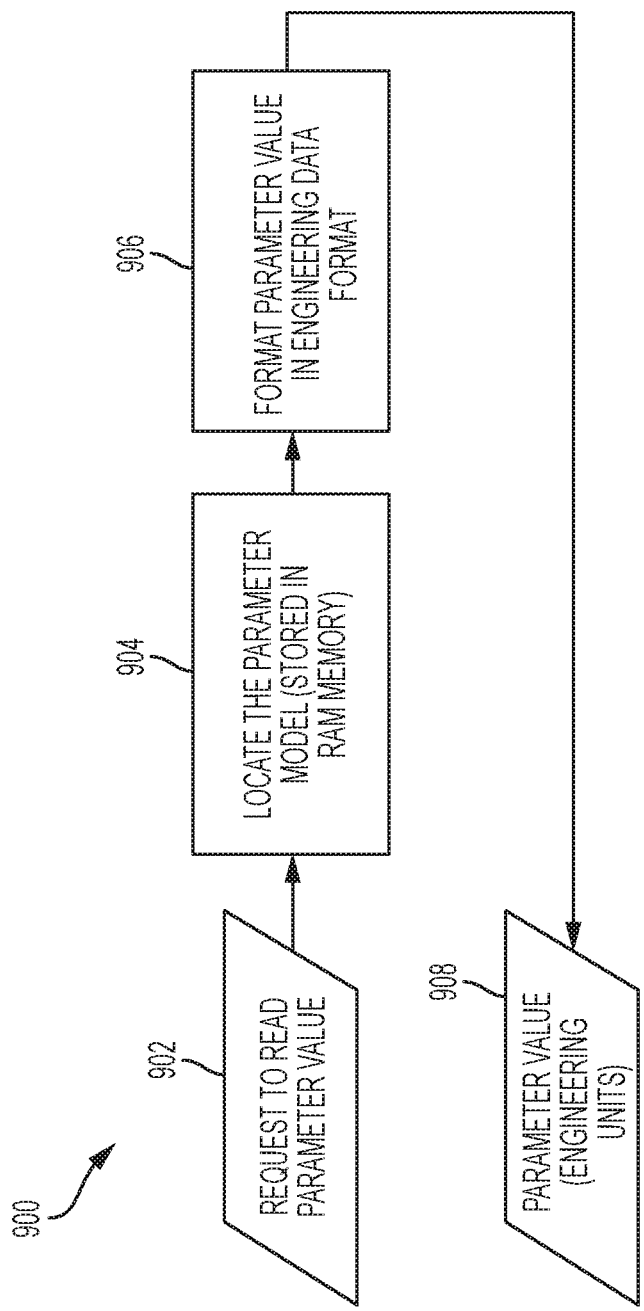
FIG. 9 is a flow diagram of a message handler process for processing a read parameter request according to various embodiments.

FIG. 9 is a flow diagram for a message handler 136 process for processing 900 a read parameter request 902 according to various embodiments. Note that message handler includes a high-performance in-memory formatting information retrieval system that represents a significant improvement over the prior art. According to some embodiments, the retrieval system utilizes a RAM-based storage technique to retrieve and utilize the formatting information more efficiently and rapidly, resulting in faster test times. When the communication server 100 is first started, all of the stored formatting information is loaded into the computer's Random Access Memory (RAM) and every possible parameter that can be monitored on vehicle 134 is formatted in RAM.

In operation, message handler 136 processes a read parameter request 902 by locating 904 formatting information for the specified parameter in RAM using a hash table, which is very fast relative to hard-disk searching. Next, message handler 136 reads the parameter (in raw binary format) from the vehicle 134 and, using the formatting information from RAM that includes the formatting information, formats 906 the raw binary data into engineering data format. Note that there is no need to look up formatting information from persistent storage at run time in a database. Message handler 136 then passes the parameter, in engineering data format, upstream to the requesting client computer 128, 130, 132 (or troubleshooting functions 114, if so requested) after which processing 900 is done 908.

Figure 10:
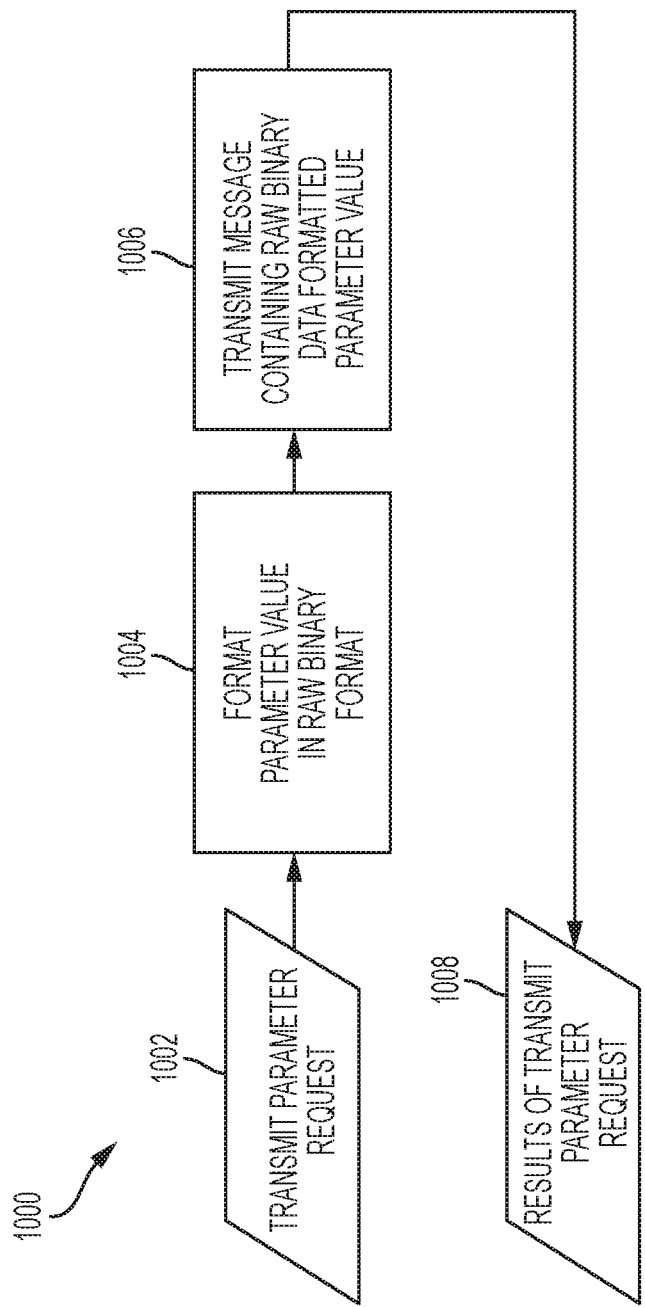
FIG. 10 is a flow diagram of a message handler process for processing a transmit parameter request according to various embodiments.

FIG. 10 is a flow diagram of a message handler 136 process for processing 1000 a transmit parameter request 1002 according to various embodiments. In operation, message handler 136 locates 1004 formatting information for the specified parameter in RAM by using a hash table and formats the specified value for specified parameter in raw binary format according to the located formatting information. Message handler 136 then transmits 1006 any results 1008 of the transmit request to vehicle 134 using API 118 via at least one of vehicle communication card 120, 122, 124.

Figure 11:
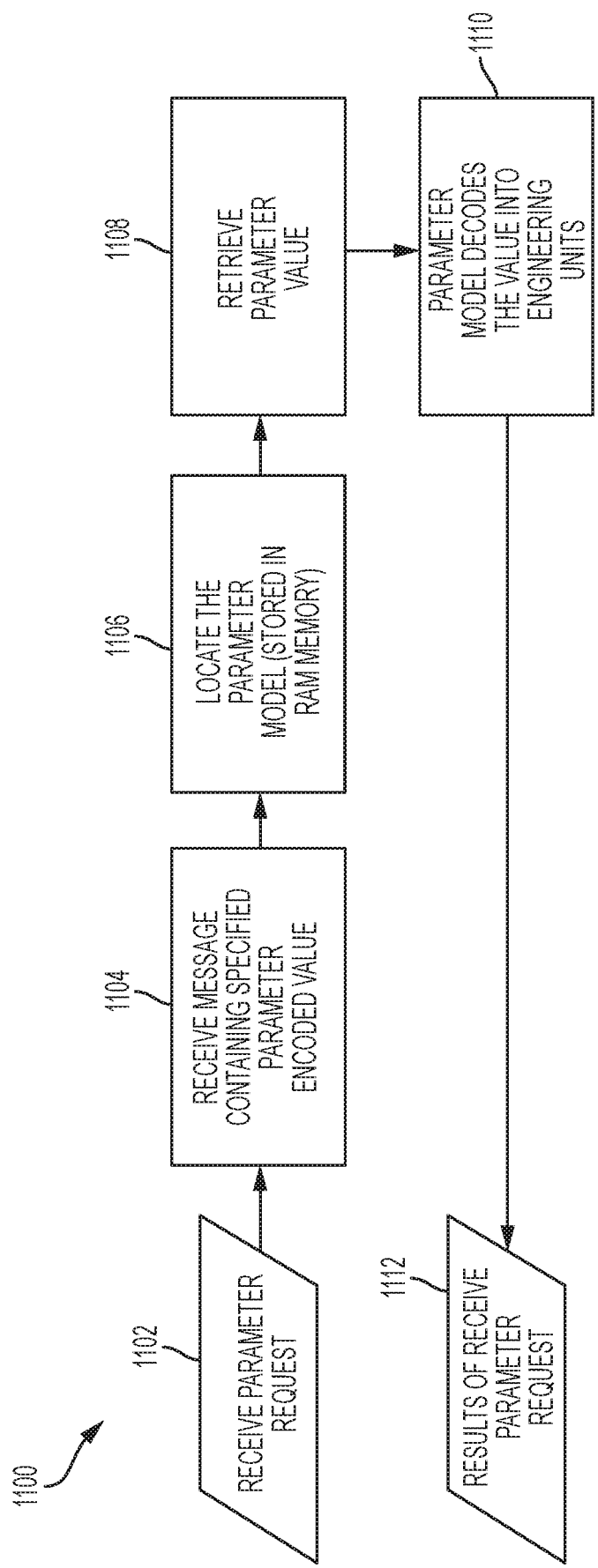
FIG. 11 is a flow diagram of a message handler process for processing a receive parameter request according to various embodiments.

FIG. 11 is a flow diagram of a message handler 136 process for processing 1100 a receive parameter request 1102 according to various embodiments. In operation, message handler 136 receives 1104 a message specifying a parameter from vehicle 134 via at least one of vehicle communication cards 120, 122, 124 and locates 1106 formatting information for the parameter in RAM using a hash table. Message handler 136 then retrieves 1108 the parameter value from vehicle 134, formats 1110 it using the retrieved formatting information into engineering data format, and provides the results 1112 of the receive parameter process to the requesting client computer 128, 130, 132 (respectively, troubleshooting functions 114).

Figure 12:
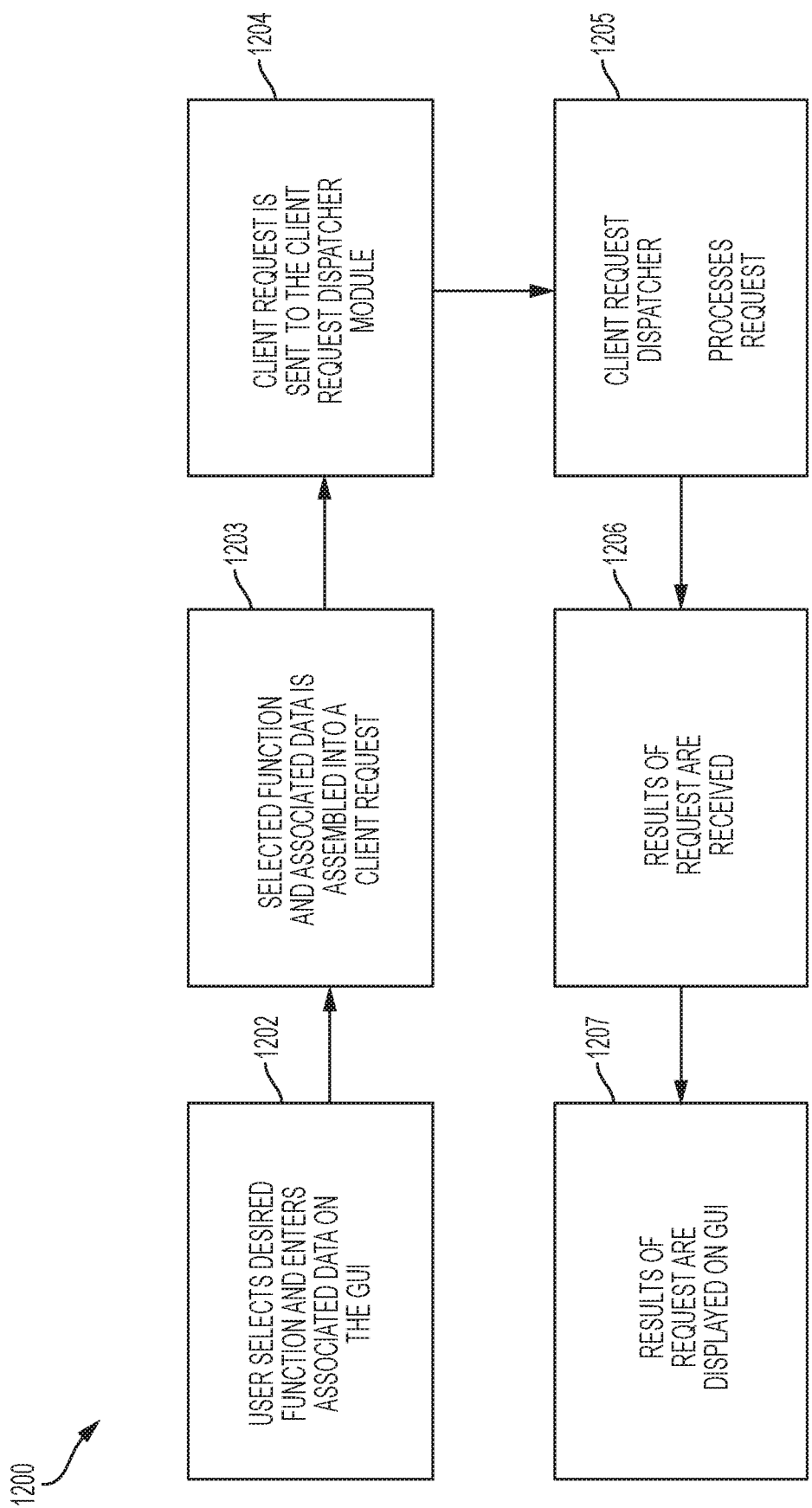
FIG. 12 is a flow diagram for processing by onboard troubleshooting functions according to various embodiments.

FIG. 12 is a flow diagram for processing 1200 by onboard troubleshooting functions 114 according to various embodiments. The onboard troubleshooting functions 114 allow a user to analyze and troubleshoot issues on vehicle 134 without having to utilize a connected client computer 128, 130, 132. Communications server 100 can be utilized in stand-alone fashion when performing this type of troubleshooting. The stand-alone troubleshooting capability is an important advance over the prior art because it enables communications server 100 to be utilized as a self-contained tool that provides troubleshooting of vehicle 134. This capability is particularly valuable for factory testing during final assembly when the vehicle systems may be connected and powered on for the first time.

The troubleshooting functions 114 enable the user to immediately see the digital representation of states and parameters of vehicle 134 and identify problems with those. For example, a digital sensor may be indicating that a door (e.g., a cargo door on an aircraft) is open when it actually is not, thus indicating a faulty sensor. Communications server 100 provides an easy way to monitor door sensors as well as many other digital signals on the vehicle 134.

Further, operators of vehicles such as Boeing 777X series aircraft need to perform periodic maintenance and repairs of the aircraft. The stand-alone troubleshooting capability of communications server 100 is therefore valuable to the commercial airlines that operate the Boeing 777X airplane.

Additionally, for vehicles such as Boeing 777X series aircraft, the troubleshooting functions 114 provide a user with access to the airplane's CMC system without having to enter the flight deck. This is important because the flight deck is often crowded with technicians or pilots who are there for other purposes. Rather than having to wait until the flight deck is available, the user can utilize the communications server 100 to access the CMC immediately, with no need to enter the flight deck.

Onboard troubleshooting functions 114 are coupled to a touchscreen graphical user interface 116 ("GUI") present on communications server 100. GUI 116 provides a user with menu selections and data entry fields. All of the capabilities that are provided for connected client computers 128, 130, 132 may also be provided to the user via GUI 116.

In operation, a user selects 1202 a function to perform using GUI 116, and enters any associated data. The function and its associated data are then assembled into a request 1203 (similar to that received from clients) that is sent 1204 to client request dispatcher 104, which processes 1205 the request. Communications server 100 then processes the request just as it would for a connected client (described above). Results 1206 of the request are then received by the onboard troubleshooting functions 114, which presents the results to the user via GUI 116. The user can view these results and use them to pinpoint and resolve any issues with vehicle 134.

Figure 13:
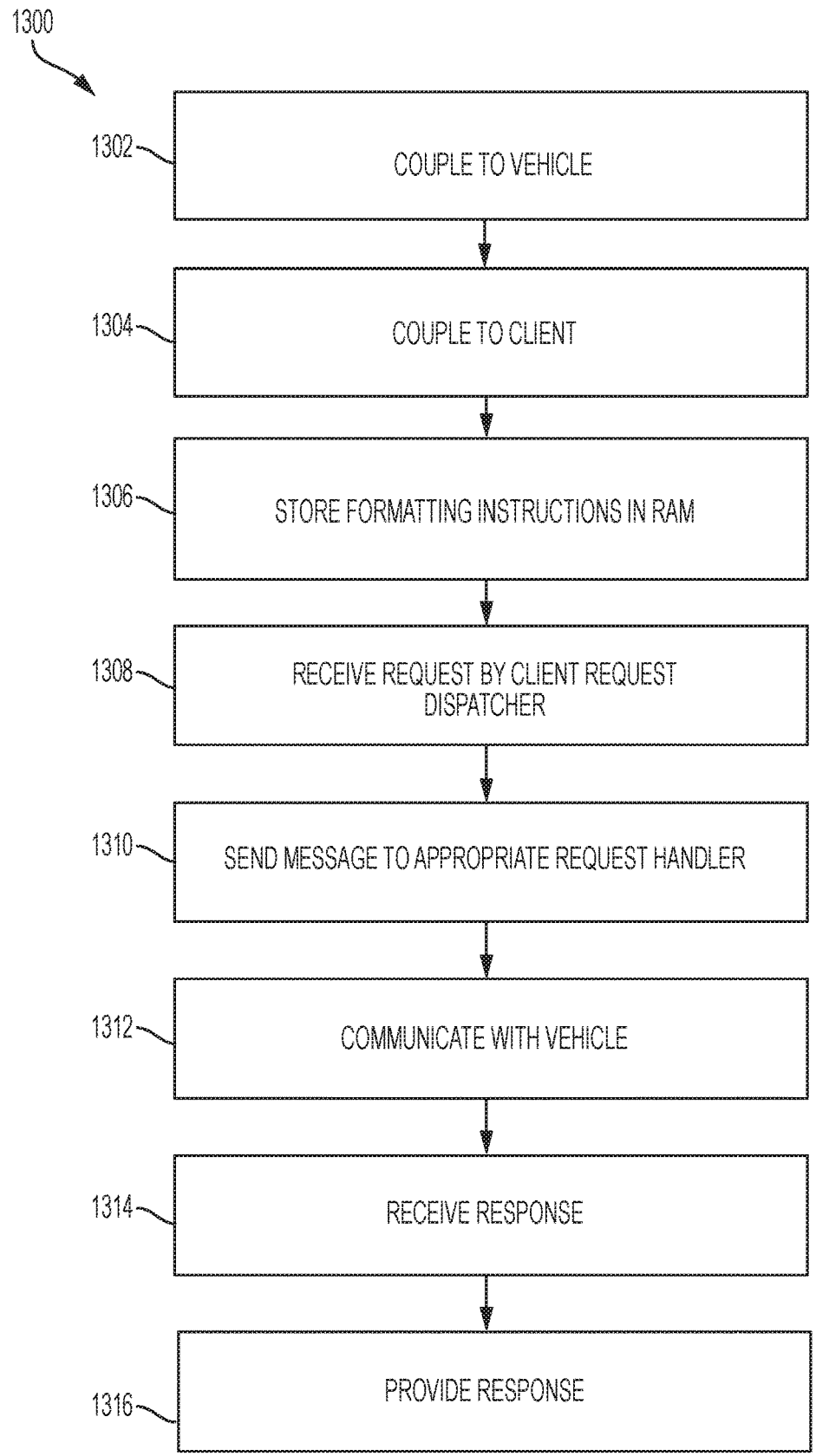
FIG. 13 is a flow diagram for a method of monitoring and testing a vehicle according to various embodiments.

FIG. 13 is a flow diagram for a method for testing and monitoring a vehicle according to various embodiments. Method 1300 may be performed by a user operating communications server 100 to analyze vehicle 134.

At block 1302, the user couples communications server 100 to vehicle 134. The coupling may be by way of one or more network communication cables, such as Ethernet cables. For aircraft, the connection may be made to the data network of the aircraft using standard or nonstandard connection cables.

At block 1304, the user couples communications server 100 to one or more client computers 128, 130, 132. The coupling may be by way of one or more Ethernet cables, for example.

At block 1306, message handler 118 of communications server 100 stores formatting information in RAM. The actions of this block are shown and described herein in reference to FIG. 8, for example.

At block 1308, client request dispatcher 104 of communications server 100 receives a request from one of client computers 128, 130, 132 via client interface 102. The actions of this block are shown and described herein in reference to FIG. 2, for example.

At block 1310, client request dispatcher 104 sends the request to an appropriate request handler 106, 108, 110, 112 for that request. The actions of this block are shown and described herein in reference to FIG. 2, for example.

At block 1312, message handler 136 of communications server 100 communicates with vehicle 134 to accomplish the client request. The actions of this block are shown and described herein in reference to FIGS. 3, 4, 5 and 6, for example.

At block 1314, client request dispatcher 104 receives a response from the appropriate request handler for the request. The actions of this block are shown and described herein in reference to FIGS. 3, 4, 5 and 6, for example.

At block 1316, client request dispatcher 104 provides the response to the requesting client computer 128, 130, 132 via client interface 102. The actions of this block are shown and described herein in reference to FIGS. 3, 4, 5 and 6, for example.

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A communications server for monitoring and troubleshooting a vehicle, the communications server comprising:
   a plurality of request handlers comprising a transmit/receive request handler configured to transmit a specified parameter with a specified value to the vehicle and to receive a value of a specified parameter from the vehicle and a dynamic monitor request handler configured to provide values of a plurality of vehicle parameters throughout a period of time; and
   at least one vehicle communications interface communicatively coupled to the dynamic monitor request handler and configured to communicatively couple to the vehicle and pass messages between the vehicle and the dynamic monitor request handler.

2. The communications server of claim 1, further comprising a client request dispatcher configured to receive a request comprising a request to provide values of a particular plurality of vehicle parameters throughout a particular period of time from at least one client through the at least one client interface, send a message representing the request to the dynamic monitor request handler, receive a response to the request from the dynamic monitor request handler, and provide the response to the at least one client computer.

3. The communications server of claim 1, wherein the vehicle communications interface comprises a plurality of vehicle interface cards and an application program interface 4.

4. The communications server of claim 1, present at a vehicle factory, and applied to a vehicle during a final assembly of the vehicle.

5. A communications server for monitoring and troubleshooting a vehicle, the communications interface comprising:
   a vehicle communications interface communicatively coupled to a message handler and configured to communicatively couple to the vehicle and pass messages between the vehicle and the message handler;
   a plurality of request handlers communicatively coupled to the message handler; and
   a message handler communicatively coupled to the at least one vehicle communications interface and to the plurality of request handlers, wherein the message handler is configured to store in random access memory formatting information for each of the plurality of vehicle parameters, wherein the message handler is further configured to communicate with the vehicle using at least some of the formatting information to translate between raw binary vehicle data and client computer working data format.

6. The communications server of claim 5, wherein the message handler is further configured to communicate with the vehicle using at least some of the formatting information to perform a request to read a value of a particular parameter for the vehicle by at least:
   locating from random access memory, using a hash table, formatting information for the particular parameter;
   reading a value of the particular parameter from the vehicle;
   formatting the value of the particular parameter according to the formatting information for the particular parameter; and
   providing the value of the particular parameter in response to the request.

7. The communications server of claim 5, wherein the vehicle communications interface comprises a plurality of vehicle interface cards and an application program interface.

8. The communications server of claim 5, present at a vehicle factory, and applied to a vehicle during a final assembly of the vehicle.

9. A communications server for monitoring and troubleshooting a vehicle, the communications server comprising:
   a vehicle communications interface communicatively coupled to at least one request handler and configured to communicatively couple to the vehicle and pass messages between the vehicle and the at least one request handler;
   a plurality of request handlers comprising a transmit/receive request handler and a dynamic monitor request handler, the plurality of request handlers communicatively coupled to the vehicle communications interface, to a client request dispatcher, and to an onboard troubleshooting functions module;
   a client request dispatcher communicatively coupled to the at least one request handler and configured to receive a request from an onboard troubleshooting functions module, send a message representing the request to an appropriate request handler of the at least one request handler, receive a response to the request from the appropriate request handler, and provide the response to the onboard troubleshooting functions module;
   an onboard troubleshooting functions module communicatively coupled to the client request dispatcher, wherein the onboard troubleshooting functions module stores a plurality of troubleshooting functions for the vehicle; and
   a user interface for the onboard troubleshooting functions module.

10. The communications server of claim 9, wherein the onboard troubleshooting functions module is configured to receive a user request at the user interface, present a message representing the request to the client request dispatcher, receive a response message from the client request dispatcher, and display to the user information representing the response message.

11. The communications server of claim 9, wherein the vehicle communications interface comprises a plurality of vehicle interface cards and an application program interface.

12. The communications server of claim 9, present at a vehicle factory, and applied to a vehicle during a final assembly of the vehicle.

13. A method of monitoring and troubleshooting a vehicle using a communications server comprising a plurality of request handlers comprising a transmit/receive request handler configured to transmit a specified parameter with a specified value to the vehicle and to receive a value of a specified parameter from the vehicle and a dynamic monitor request handler communicatively coupled to at least one vehicle communications interface, wherein the dynamic monitor request handler is configured to provide values of a plurality of vehicle parameters throughout a period of time, the method comprising:
communicatively coupling the at least one vehicle communications interface to the vehicle;
receiving, by the system, a request to provide values of a plurality of vehicle parameters throughout a period of time;
sending, by the system, a message representing the request to the dynamic monitor request handler;
communicating, by the system, with the vehicle, to perform the request;
receiving, by the system, a response to the request from the dynamic monitor request handler; and
providing the response.

14. The method of claim 11, wherein the request comprises a request to provide values of a particular plurality of vehicle parameters throughout a particular period of time, wherein the appropriate request handler comprises the dynamic monitor request handler, the method further comprising, by the client request dispatcher:
sending a message representing the request to the dynamic monitor request handler;
receiving a response to the request from the dynamic monitor request handler; and
providing the response to the at least one client computer.

15. The method of claim 14, wherein the vehicle communications interface comprises a plurality of vehicle interface cards and an application program interface.

16. The method of claim 14, applied to a vehicle during a final assembly of the vehicle at a factory.

17. A method of monitoring and troubleshooting a vehicle using a communications server comprising a plurality of request handlers communicatively coupled to a at least one vehicle communications interface, at least one vehicle communications interface communicatively coupled to a message handler and configured to pass messages between the vehicle and the message handler, and a message handler communicatively coupled to the at least one vehicle communications interface and to the at plurality of request handlers, the method comprising:
communicatively coupling the at least one vehicle communications interface to the vehicle;
storing in random access memory of the message handler formatting information for each of the plurality of vehicle parameters;
receiving, by the system, a request;
sending a message representing the request to an appropriate request handler of the plurality of request handlers;
communicating, by the message handler, with the vehicle, using at least some of the formatting information, to translate between raw binary vehicle data and client computer working data format;
receiving, by the system, a response to the request from the appropriate request handler; and
providing the response.

18. The method of claim 17, wherein the request comprises a request to read a value of a particular parameter for the vehicle, the method further comprising:
locating from random access memory, using a hash table, formatting information for the particular parameter;
reading a value of the particular parameter from the vehicle;
formatting the value of the particular parameter according to the formatting information for the particular parameter; and
providing the value of the particular parameter in response to the request.

19. The method of claim 17, wherein the vehicle communications interface comprises a plurality of vehicle interface cards and an application program interface.

20. The method of claim 17, applied to a vehicle during a final assembly of the vehicle at a factory.

21. A method of monitoring and troubleshooting a vehicle using a communications server comprising a vehicle communications interface communicatively coupled to a plurality of request handlers comprising a transmit/receive request handler and a dynamic monitor request handler and configured to communicatively couple to the vehicle and pass messages between the vehicle and the plurality of request handlers, at least one of the plurality of request handlers communicatively coupled to the vehicle communications interface, to a client request dispatcher, and to an onboard troubleshooting functions module, a client request dispatcher communicatively coupled to the at least one of the plurality of request handlers, an onboard troubleshooting functions module communicatively coupled to the client request dispatcher, wherein the onboard troubleshooting functions module stores a plurality of troubleshooting functions for the vehicle, and a user interface for the onboard troubleshooting functions module, the method comprising:
receiving, by the client requires dispatcher, a request from the onboard troubleshooting functions module;
sending a message representing the request to an appropriate request handler of the of the plurality of request handlers;
receiving results of the request from the appropriate request handler; and
providing the response to the onboard troubleshooting functions module.

22. The method of claim 21, further comprising:
receiving the request at the user interface;
presenting a message representing the request to the client request dispatcher;
receiving a response message from the client request dispatcher; and
displaying information representing the response message.

23. The method of claim 21, wherein the vehicle communications interface comprises a plurality of vehicle interface cards and an application program interface.

24. The method of claim 21, applied to a vehicle during a final assembly of the vehicle at a factory.

* * * * *